(12) United States Patent
Calmon et al.

(10) Patent No.: US 11,327,801 B2
(45) Date of Patent: May 10, 2022

(54) INITIALIZATION OF RESOURCE ALLOCATION FOR A WORKLOAD CHARACTERIZED USING A REGRESSION MODEL

(71) Applicant: EMC IP Holding Company LLC, Hopkinton, MA (US)

(72) Inventors: Tiago Salviano Calmon, Rio de Janeiro (BR); Vinícius Michel Gottin, Rio de Janeiro (BR); Eduardo Vera Sousa, Niterói (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 357 days.

(21) Appl. No.: 16/554,897

(22) Filed: Aug. 29, 2019

(65) Prior Publication Data
US 2021/0064436 A1    Mar. 4, 2021

(51) Int. Cl.
*G06F 9/46*    (2006.01)
*G06F 9/50*    (2006.01)

(52) U.S. Cl.
CPC .......... *G06F 9/5027* (2013.01); *G06F 9/5016* (2013.01); *G06F 2209/501* (2013.01)

(58) Field of Classification Search
None
See application file for complete search history.

(56) References Cited

U.S. PATENT DOCUMENTS

| 5,519,605 | A  | 5/1996  | Cawlfield et al. |
| 7,039,559 | B2 * | 5/2006 | Froehlich ............ G06F 9/5083 |
|           |    |         | 702/183 |
| 7,647,405 | B2 | 1/2010  | Bivens |
| 7,827,361 | B1 | 11/2010 | Karlsson |

(Continued)

FOREIGN PATENT DOCUMENTS

CN          108881283 A    11/2018

OTHER PUBLICATIONS

Abdelzaher et al., "Introduction to Control Theory And Its Application to Computing Systems", Performance Modeling and Engineering—Chapter 7 (Year: 2008).

(Continued)

*Primary Examiner* — Bing Zhao
(74) *Attorney, Agent, or Firm* — Ryan, Mason & Lewis, LLP

(57) ABSTRACT

Techniques are provided for adaptive resource allocation for workloads with initial condition setting. One method comprises obtaining a dataset comprising data from previous executions of a workload, wherein the data comprises a plurality of different resource allocations and parameterizations of the workload; determining an initial allocation of an amount of a resource for the workload based on a regression model characterizing a behavior of the workload, the data, a predefined service metric and a characterization of a target infrastructure; and initiating an application of the determined initial allocation of the amount of the resource for the workload. A performance of one or more of the plurality of (Continued)

workloads can be evaluated based on a percentage of time within a predefined error range. The regression model can be updated and/or replaced over time with new data for additional executions of the at least one workload.

20 Claims, 13 Drawing Sheets

(56) References Cited

U.S. PATENT DOCUMENTS

| | | | |
|---|---|---|---|
| 8,250,581 | B1 | 8/2012 | Blanding |
| 8,429,096 | B1 | 4/2013 | Soundararajan |
| 9,531,604 | B2 * | 12/2016 | Akolkar ................ H04L 47/70 |
| 10,257,275 | B1 | 4/2019 | Dirac |
| 10,412,118 | B1 | 9/2019 | Davis et al. |
| 10,642,763 | B2 | 5/2020 | Longo |
| 2002/0055989 | A1 | 5/2002 | Stringer-Calvert et al. |
| 2005/0188088 | A1 | 8/2005 | Fellenstein |
| 2006/0280119 | A1 | 12/2006 | Karamanolis et al. |
| 2006/0294044 | A1 | 12/2006 | Karlsson et al. |
| 2007/0088532 | A1 | 4/2007 | Alvarez et al. |
| 2007/0162161 | A1 | 7/2007 | Kumar et al. |
| 2007/0234365 | A1 | 10/2007 | Savit |
| 2007/0276512 | A1 | 11/2007 | Fan et al. |
| 2007/0283016 | A1 | 12/2007 | Pendarakis et al. |
| 2008/0022285 | A1 | 1/2008 | Cherkasova |
| 2008/0180247 | A1 | 7/2008 | Deoalikar et al. |
| 2010/0091786 | A1 | 4/2010 | Liu et al. |
| 2010/0168989 | A1 | 7/2010 | Gao |
| 2010/0299655 | A1 | 11/2010 | Heisch et al. |
| 2010/0201573 | A1 | 12/2010 | Lamming |
| 2012/0110582 | A1 | 5/2012 | Ferdous et al. |
| 2013/0185433 | A1 | 7/2013 | Zhu |
| 2014/0211811 | A1 | 7/2014 | Ludwig |
| 2015/0007182 | A1 | 1/2015 | Rossbach et al. |
| 2015/0040133 | A1 | 2/2015 | Caufield |
| 2016/0147203 | A1 | 5/2016 | Di Cairano |
| 2016/0162209 | A1 | 6/2016 | Calderone et al. |
| 2017/0048308 | A1 | 2/2017 | Qaisar |
| 2017/0161199 | A1 | 6/2017 | Shah |
| 2017/0242729 | A1 | 8/2017 | Chen et al. |
| 2017/0255491 | A1 | 9/2017 | Bradshaw et al. |
| 2018/0101214 | A1 | 4/2018 | Mahindru |
| 2018/0176089 | A1 | 6/2018 | Ritter et al. |
| 2018/0246558 | A1 | 8/2018 | Morad |
| 2019/0075184 | A1 | 3/2019 | Seed, IV et al. |
| 2019/0101903 | A1 | 4/2019 | Katti et al. |
| 2019/0266015 | A1 | 8/2019 | Chandra et al. |
| 2019/0319861 | A1 | 10/2019 | Pan et al. |
| 2020/0167145 | A1 | 5/2020 | Franchitti et al. |
| 2020/0177671 | A1 | 6/2020 | Tofighbakhsh et al. |
| 2020/0241921 | A1 | 7/2020 | Calmon et al. |
| 2020/0301741 | A1 | 9/2020 | Gabrielson et al. |
| 2020/0348979 | A1 | 11/2020 | Calmon |

OTHER PUBLICATIONS

Calmon et al., "Control strategies for adaptive resource allocation in cloud computing", 21st IFAC World Congress (Virtual), Berlin, Germany (Jul. 12-17, 2020).
Patikirikorala et al., "Towards Optimal Performance and Resource Management in Web Systems via Model Predictive Control", 2011 Australian Control Conference, Melbourne, Australia (Nov. 10 & 11, 2011).
Skarin et al., "An assisting Model Predictive Controller approach to Control over the Cloud", Lund University (May 15, 2019).
Atzori et al., "The Internet of Things: A survey," Computer Networks, 54 (2010) 2787-2805.
Schooler et al., "Architectural Vision for a Data-Centric IoT: Rethinking Things, Trust and Clouds," In Distributed Computing Systems (ICDCS), 2017 IEEE 37th International Conference on (pp. 1717-1728). IEEE.
Bonomi et al., "Fog computing and its role in the internet of things," In Proceedings of the first edition of the MCC workshop on Mobile cloud computing (pp. 13-16). ACM, 2012.
Shi et al., "Edge computing: Vision and challenges," IEEE Internet of Things Journal, 3(5), 637-646.
Mahadev et al., "The Case for VM-Based Cloudlets in Mobile Computing, Pervasive Computing," IEEE, 8 (2009) 14-23.
Morabito et al., "Consolidate IoT edge computing with lightweight virtualization," IEEE Network, 32(1), 102-111.
Ismail et al., "Evaluation of docker as edge computing platform," In Open Systems (ICOS), 2015 IEEE Confernece on (pp. 130-135). IEEE.
Mahmud et al., "Fog computing: A taxonomy, survey and future directions," In Internet of Everything (pp. 103-130). Springer, Singapore.
Inaba et al., "Applications of weighted Voronoi diagrams and randomization to variance-based k-clustering," In Proceedings of the tenth annual symposium on Computational geometry (pp. 332-339). ACM.
Thönes, J. "Microservices." IEEE Software 32.1 (2015): 116-116.
Lewis et al., "Microservices," Available in: martinfowler.com/articles/microservices.html. Access in: Sep. 27, 2017.
Pahl et al., "Containers and clusters for edge cloud architectures—a technology review," In Future Internet of Things and Cloud (FiCloud), 2015 3rd International Conference on (pp. 379-386). IEEE.
Misra et al., "On Theoretical Modeling of Sensor Cloud: A Paradigm Shift From Wireless Sensor Network," IEEE Systems Journal, vol. 11, No. 2, pp. 1084-1093, Jun. 2017.
Taleb et al., "Mobile edge computing potential in making cities smarter," IEEE Communications Magazine, 55(3), 38-43.
Bouzeghoub, M., "A framework for analysis of data freshness," In Proceedings of the 2004 international workshop on Information quality in information systems (pp. 59-67). ACM.
"CEP," Available in: en.wikipedia.org/wiki/Complex_event_processing.
"Publish—subscribe pattern," Available in: en.wikipedia.org/wiki/Publish%E2%80%93subscribe_pattern.
Chatterjee et al., "Optimal Composition of a Virtual Sensor for Efficient Virtualization within Sensor-Cloud," in Proceedings of IEEE International Conferencce on Communications, Jun. 2015, pp. 448-453.
Yi et al., "A survey of fog computing: concepts, applications and issues." Proceedings of the 2015 Workshop on Mobile Big Data. ACM, 2015.
Santos et al., "Olympus: The cloud of sensors," IEEE Cloud Computing, 2(2), 48-56.
Delicato et al.,. "The Resource Management Challenge in IoT," In Resource Management for Internet of Things (pp. 7-18). Springer International Publishing (2017).
Wang et al., "ENORM: A framework for edge node resource management," IEEE Transactions on Services Computing (2017).
Skarlat et al., "Resource Provisioning for IoT Services in the Fog," 2016 IEEE 9th International Conference on Service-Oriented Computing and Applications (SOCA), Macau, 2016, pp. 32-39.
Roy et al., "DIVISOR: Dynamic Virtual Sensor Formation for Overlapping Region in IoT-based Sensor—Cloud," Proceedings of the IEEE Wireless Communications and Networking Conference, 2018.
Skarlat et al., "Optimized IoT service placement in the fog," Serv. Oriented Comput. Appl. 11, 4 (Dec. 2017), 427-443. DOI: doi.org/10.1007/s11761-017-0219-8 (2017).
Dautov et al., "Pushing Intelligence to the Edge with a Stream Processing Architecture," 2017 IEEE International Conference on Internet of Things (iThings) and IEEE Green Computing and Methods and Apparatus for Real-Time Anomaly Detection over Sets of Time Series—Nov. 2017 Dell EMC Confidential pp. 24 of 24 Communications (GreenCom) and IEEE Cyber, Physical and Social Computing (CPSCom) and IEEE Smart Data (SmartData), Exeter, 2017, pp. 792-799.
"Hypervisor," Available in: en.wikipedia.org/wiki/Hypervisor.
"EdgeX Foundry," Available in: www.edgexfoundry.org.
"Orion Context Broker," Available in: catalogue.fiware.org/enablers/publishsubscribe-context-broker-orion-context-broker.

(56) References Cited

OTHER PUBLICATIONS

"FIWARE NGSI Open RESTful API Specification," Available in: forge.fiware.org/plugins/mediawiki/wiki/fiware/index.php/FI-WARE_NGSI_Open_RESTful_API_Specification. Last accessed: Jun. 28, 2018.
"ZeroMQ," Available in: en.wikipedia.org/wiki/ZeroMQ.
U.S. Appl. No. 15/941,434, entitled, "Allocation of Shared Computing Resources Using Source Code Feature Extraction and Machine Learning", filed Mar. 30, 2018.
U.S. Appl. No. 16/554,910, entitled, "Early-Convergence Detection for Online Resource Allocation Policies for Iterative Workloads", filed Aug. 29, 2019.
U.S. Appl. No. 16/034,432, entitled, "Resource Allocation and Provisioning in a Multi-Tier Edge-Cloud Virtualization Environment", filed Jul. 13, 2018.
U.S. Appl. No. 16/039,743, entitled, "Allocation of Shared Computing Resources Using Source Code Feature Extraction and Clustering-Based Training of Machine Learning Models", filed Jul. 19, 2018.
U.S. Appl. No. 16/259,244, entitled, Building Neural Networks for Resource Allocation for Iterative Workloads Using Reinforcement Learning, filed Jan. 28, 2019.
U.S. Appl. No. 16/401,604, entitled, "Resource Allocation and Provisioning in a Multi-Tier Edge-Cloud Virtualization Environment", filed May 2, 2019.
U.S. Appl. No. 16/263,135 entitled, "Adaptive Look-Ahead Configuration for Prefetching Data in Input/Output Operations," filed Jan. 31, 2019.
U.S. Appl. No. 16/397,596, entitled, "Adaptive Look-Ahead Configuration for Pre-Fetching Data in Input/Output Operations Based on Request Size and Frequency", filed Apr. 29, 2019.
U.S. Appl. No. 16/456,551, entitled "Adaptive Controller for Online Resource Allocation For Multiple Workloads," filed on Jun. 28, 2019.
U.S. Appl. No. 16/554,910, entitled "Early-Convergence Detection for Online Allocation Policies in Iterative Workloads," filed on Aug. 29, 2019.
U.S. Appl. No. 16/400,289, entitled "Adaptive Controller for Online Adaptation of Resource Allocation Policies for Iterative Workloads Using Reinforcement Learning," filed on May 1, 2019.
U.S. Appl. No. 15/497,803, entitled "Network-Based Combination of Heterogeneous Machine Learning Models," filed on Apr. 26, 2017.
Liu et al., "Adaptive Entitlement Control of Resource Containers on Shared Servers,"IFIP/IEEE International Symposium on Integrated Network Management, pp. 163-176, May 2005.
D. Merkel, "Docker: Ligtweight Linux Containers for Consistent Development and Deployment," Linux Journal, vol. 2, p. 239, (2014).
Betts et al., "Estimating the WCET of GPU-accelerated applications using hybrid analysis," Real-Time Systems (ECRTS), 2013.
K. Hornik, "Approximation capabilities of multilayer feedforward networks," Neural networks, vol. 2, No. 4, pp. 251-257, 1991.
Sudarsan et al.; "Design and performance of a scheduling framework for resizable parallel applications", (Year 2010).
Nguyen et al.; "Using Runtime Measured Workload Characteristics in Parallel Processor Scheduling", (Year: 1996).
Azhar et al.; "SLOOP: QoS-Supervised Loop Execution to Reduce Energy on Heterogeneous Architectures", (Year 2017).
Thamsen et al.; "Continuously Improving the Resource Utilization of Iterative Parallel Dataflows", (Year: 2016).
Huber et al. "Model-Based Self-Aware Performance and Resource Management Using the Descartes Modeling Language," in IEEE Transactions on Software Engineering, vol. 43, No. 5, pp. 432-452, May 1, 2017, doi: 10.1109/TSE.2016.2613863. (Year: 2017).

\* cited by examiner

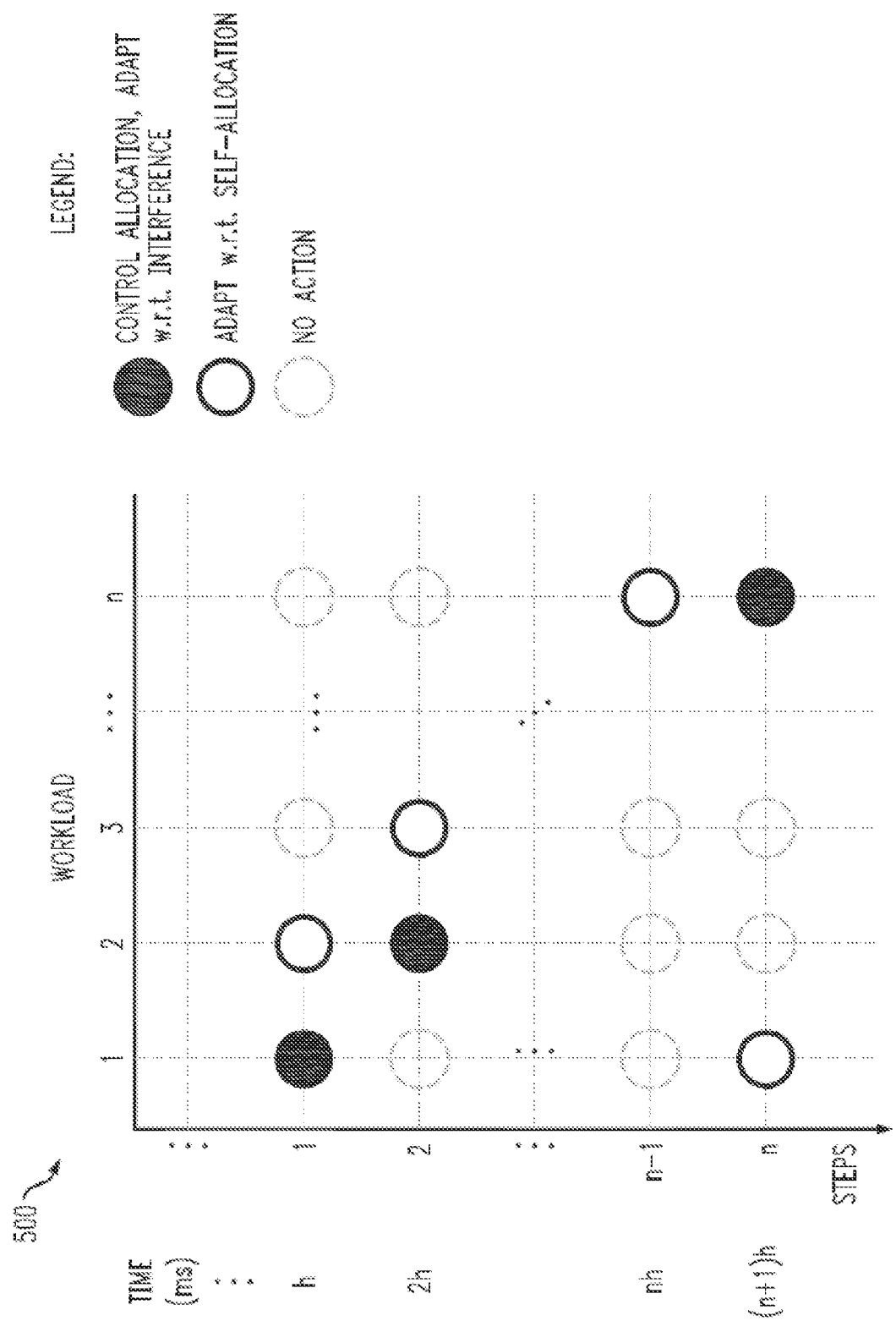

FIG. 6B

INFRASTRUCTURE FEATURES 650
- GPU/CPU 655
- NUMBER OF CORES 660
- INPUT IMAGE SIZE 665
- DISCRETIZATION OF PARAMETER SPACE 670
- THRESHOLD FOR EDGE DETECTION 675

LANE DETECTION WORKLOAD

FIG. 6A

INFRASTRUCTURE FEATURES 600
- GPU/CPU 610
- NUMBER OF CORES 620
- BATCH SIZE 625
- INPUT SIZE 630
- NUMBER OF EPOCHS 635

DNN WORKLOAD

INITIALIZATION OF RESOURCE ALLOCATION FOR A WORKLOAD CHARACTERIZED USING A REGRESSION MODEL

CROSS-REFERENCE TO RELATED APPLICATION(S)

The present application is related to U.S. patent application Ser. No. 16/554,910, filed Aug. 29, 2019, entitled "Early-Convergence Detection for Online Resource Allocation Policies for Iterative Workloads," (now U.S. Pat. No. 11,113,171), incorporated by reference herein in its entirety.

FIELD

The field relates generally to resource allocation techniques.

BACKGROUND

Cloud computing has become increasingly popular due to a number of benefits. For example, cloud computing offers pay-per-use computation for customers and resource sharing for service providers. Through virtualization, a pool of computation devices can be abstracted and computational resources can be offered that are tailored to the needs of customers, who may contract for more computation as their needs grow.

Using an infrastructure efficiently to execute workloads while respecting Service Level Agreements (SLAs) and, thus, guaranteeing a specified Quality of Service (QoS), poses a number of challenges. Service providers aim to provide services to their customers while respecting SLAs and minimizing resource usage. One challenge is that SLAs are typically set prior to execution of a job, but the execution environment is subject to a number of possible disturbances (e.g., poor knowledge about actual resource needs, demand peaks and/or hardware malfunctions). Thus, employing a fixed amount of allocated resources may not be a good solution.

A need therefore exists for improved techniques for resource allocation for execution of multiple workloads.

SUMMARY

In one embodiment, a method comprises obtaining a dataset comprising data from previous executions of at least one workload of a plurality of workloads, wherein the data comprises a plurality of different resource allocations and parameterizations of the at least one workload; determining an initial allocation of an amount of at least one resource for the at least one workload based at least in part on (i) a regression model characterizing a behavior of the at least one workload, (ii) the data, (iii) at least one predefined service metric and (iv) a characterization of a target infrastructure; and initiating an application of the determined initial allocation of the amount of the at least one resource for the at least one workload.

In some embodiments, a performance of one or more of the plurality of workloads is evaluated based on a percentage of time within a predefined error range. The regression model can be updated and/or replaced over time with new data for additional executions of the at least one workload.

In one or more embodiments, a plurality of the regression models is available, an accuracy of each of the plurality of the regression models is evaluated over time to identify a most fitting model; and/or at least one of the regression models is retrained when a predefined model degradation standard is violated.

Other illustrative embodiments include, without limitation, apparatus, systems, methods and computer program products comprising processor-readable storage media.

BRIEF DESCRIPTION OF THE DRAWINGS

FIG. 5 illustrates exemplary cycles for adapting a resource allocation for multiple workloads, according to some embodiments;

FIGS. 6A and 6B illustrate exemplary input datasets for two exemplary workloads, according to various implementations;

DETAILED DESCRIPTION

Figure 1:
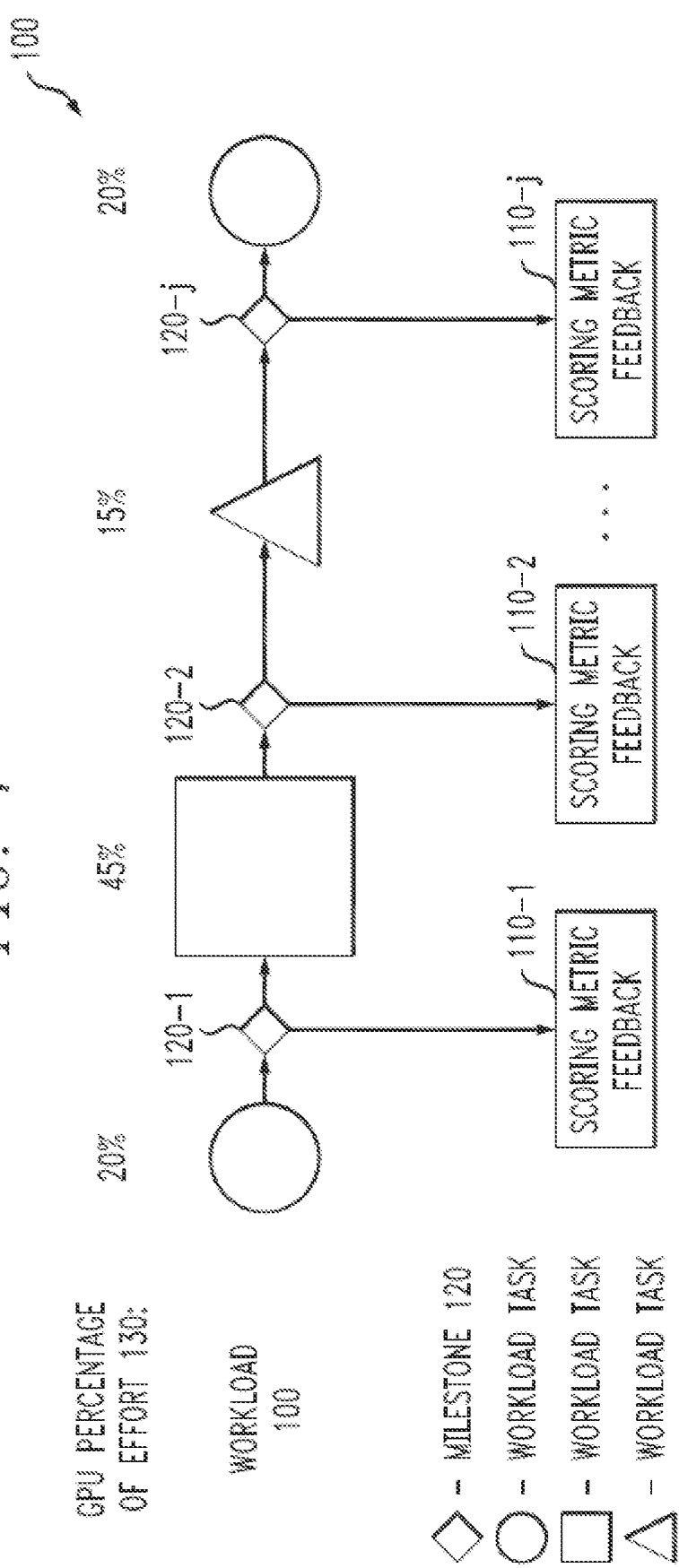
FIG. 1 illustrates a given workload with milestones and associated effort for a given infrastructure, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for initial condition setting for a resource allocation for multiple workloads.

In one or more embodiments, online resource allocation techniques are provided for multiple concurrent workloads based on a cyclic adaptive controller (e.g., learning how the interference affects each monitored workload, while also providing stability, resilience to disturbances and robustness). See, for example, U.S. patent application Ser. No. 16/456,551, filed Jun. 28, 2019, entitled "Adaptive Controller for Online Resource Allocation for Multiple Workloads," incorporated by reference herein in its entirety.

One or more embodiments of the resource allocation techniques described in U.S. patent application Ser. No. 16/456,551 may limit the number of controlled workloads and delay the convergence of each workload proportionally to the number of competing workloads. In at least one embodiment of the present disclosure, techniques are provided for the early detection and adaptation of the control loop of the cyclic adaptive controller to remove and re-insert converged and diverged workloads, as required. The disclosed approach enables more jobs to be controlled in parallel and allows faster convergence of workloads.

Cloud Computing has gained the attention of businesses because of its benefits, which include pay-per-use computation by customers and resource sharing for the service providers. Through virtualization, the main technology behind clouds, it is possible to abstract a pool of computation devices and offer computational resources better tailored to the needs of customers who may contract more computation resources as their necessities grow. In this environment, other resource abstractions emerged, the most prominent example being containers. It is also possible to offer computation without the explicit necessity of the customer to know which underlying infrastructure is running his or her code. This can be achieved in the Platform-as-a-Service (PaaS) paradigm and also the Function-as-a-Service (FaaS, serverless computing) paradigm.

In each of these paradigms, the usual agreements upon QoS expected by the customer are expressed through several SLAs. These typically include response time, execution time, uptime percentage, among others metrics. The SLAs are usually agreed prior to the service through reference target metric values. Providers aim at respecting these targets in order to avoid contractual fines. Furthermore, failing to meet the targets also diminishes the perceived trust of the provider by the customer.

One way to ensure SLAs is to dedicate a large, static, amount of resources to each customer. There are problems with this approach. In general, an application cannot be assumed to be bounded by one particular resource. Some applications, for example, might have an input/output-intensive phase and, afterwards, a compute-intensive phase. Dedicating a large amount of all resources to an application is often inefficient, resulting in spare resources at the different phases of the application. In addition, the initial guess on how many resources are needed to run an application might be over- or underestimated.

Another aspect of excessive resource allocation is that of the restrictions it applies to the service providers. Assuming a provider with a large pool of computational resources, any particular application does not need to care about resource constraints (e.g., from the point of view of the application, more resources are always available within reasonable limits established by the SLA). However, from the point of view of the provider who deals with many customers concurrently, the volume of spare resources dictates how many jobs can be run in parallel while respecting SLAs. In this sense, optimizing the adaptation of resource allocation of a single job impacts the efficiency of the system as a whole.

In opposition to SLAs, which are set prior to the execution of a job, the execution environment is quite dynamic. New workloads might come and compete for resources and unplanned demand peaks might occur, which might disrupt the original workload planning due to tasks with higher priorities, a greater need to share the environment and overheads because of context switching. Service providers always aim to provide services to their customers respecting SLAs and minimizing resource usage. This is the scenario that provides the optimal profit for them. To do so, a static approach of allocation, which dedicates resources to a job from its start through its completion, is naturally inefficient, and, thus, sub-optimal.

A number of published techniques, however, use this static approach coupled with some probabilistic analysis to overprovision as little as possible. This avoids SLA infringements at the cost of having an inefficient allocation. Other works consider this problem as a queue theory problem. This is a special case and the representative power of queues is smaller than the one of a dynamic model. Furthermore, queueing models usually assume some knowledge a priori, such as the average processing rate of a request.

The resource allocation techniques described in U.S. patent application Ser. No. 16/456,551 are based on feedback of the job execution and prior knowledge of its stages. The disclosed resource allocation techniques solve a problem of synchronous control in distinguishing between the impact of self-allocation of resources and the interference caused by the allocation of resources to concurrent workloads. While that approach allows for controlling multiple concurrent workloads, it imposes practical restrictions on both the number of workloads as well as the interval between each adaptation and control action.

One or more embodiments of the present disclosure provide for calculating an initial allocation for a workload based on previous allocations.

A characteristic of infrastructure provisioning is the variability in perceived demand. Service providers are willing to charge an amount per computation usage, and these providers can have a lot of customers. Thus, it is natural that the demand varies within different time frames, such as on a daily basis, a weekly basis or a monthly basis. This variation of demand itself imposes several challenges, since the intention of the provider is to serve each customer at the level of service defined in contract. The aforementioned contracts, materialized in multiple SLAs, also impose a significant challenge: they are set prior to the service provisioning. This means that, no matter what happens in the time of execution, these SLAs must be respected. Examples of events that could disrupt providers include, but are not limited to, sharp demand peaks, malfunction of machines and unrealistic contracts. In some cases, it is not possible to reach every single SLA, and it is also an important decision to prioritize some of the workloads to the detriment of others.

To comply with all contracts made with customers is challenging. Even though some knowledge of the future workloads to come may exist and some demand prediction engine is set, there is always some error, which may make the task of respecting all SLAs unfeasible.

Initial estimation of resource allocation is a hard task. Random estimations may lead to a waste of resources or SLA infringements. Although the latter is a more harmful problem, the first may lead to a higher interference and wrong resource allocation for concurrent workloads.

In one or more embodiments, the disclosed resource allocation techniques are based, at least in part, on the resource allocation techniques described in U.S. patent application Ser. No. 16/456,551, including a definition of a model for the dynamics of the iterative workload execution. The model is intended to be flexible enough to be adaptable to a wide range of workloads. To this end, some embodiments assume that a first order model that relates the SLA metric to allocations is good enough if adapted online, as suggested in X. Liu et al., "Adaptive Entitlement Control of Resource Containers on Shared Servers," IFIP/IEEE International Symposium on Integrated Network Management, 163-76 (May 2005), incorporated by reference herein in its entirety. In summary, one or more embodiments assume that the dynamics that relate allocations with SLA metrics are of the kind:

$$s_i(k)=s_i(k-1)+b_{1i}\Delta u_i(k)-b_{2i}\Sigma_{j\neq i}u_j(k),$$

where s(k) is the SLA metric of interest in step k, $b_{1i}$ is the term that relates the self-allocation of workload i with respect to target SLA metric, $b_{2i}$ is the term that accounts for interference of allocations of other workloads with respect to target SLA metric, and $u_i(k)$ is the amount of a particular resource allocated at a step k.

U.S. patent application Ser. No. 16/456,551 discloses an automatic mechanism to control multiple iterative workloads from a single machine, assuming the workloads share resources. This control does not assume prior knowledge of such workloads and aims to stabilize these in the long run with respect to SLA metrics. In at least one embodiment, the controller takes three pieces of information as inputs:
- the current SLA metric measured at the time of the control;
- the previously measured SLA metric; and
- the amount of CPU spent by all the other concurrent workloads.

All of the workloads are controlled and adapted once per cycle, by dividing the full control process into n steps, where n is the number of monitored/controlled workloads at a moment in time. (n−1) steps are used to collect enough data to adapt the self-allocation parameter, $\hat{b}_{1i}$, and the other remaining step to adapt the interference parameter, $b_{2i}$, and apply the control law with both learned parameters.

One or more embodiments provide a mechanism to automatically adapt an infrastructure in order to accommodate workload necessity. The exemplary disclosed mechanism works by measuring the current performance of a workload and comparing the measured current performance to reference levels. This comparison allows on-the-fly adaptations to be performed and ensures a substantially maximum profit generation by respecting the SLAs associated with the workloads with higher profit generation potential, or the ones that lead to the highest fines if not respected.

FIG. 1 illustrates a given workload 100 with well-defined milestones 120 and associated effort 130 for a given infrastructure, according to one embodiment of the disclosure. One example of this kind of job is the training of a Deep Neural Network, which is performed in fixed-size iterations. It is assumed that workload 100 will produce information feedback 110-1 through 110-n, such as a scoring metric feedback 110-1, a scoring metric feedback 110-2, and a scoring metric feedback 110-j.

As shown in Adam Betts and Alastair F. Donaldson, "Estimating the WCET of GPU-Accelerated Applications Using Hybrid Analysis," *Real-Time Systems (ECRTS)* (2013), incorporated by reference herein in its entirety, ultimately, source code can be instrumented to perform such actions. So, this step is considered feasible for all kinds of jobs. In more well-behaved and specific embodiments, the source code is instrumented with intermediate feedback as a design decision.

As shown in FIG. 1, the percentage of effort 130 for a given infrastructure, such as a graphics processing unit (GPUs), is indicated between each exemplary milestone 120-1 through 120-j of the workload 100.

Figure 2:
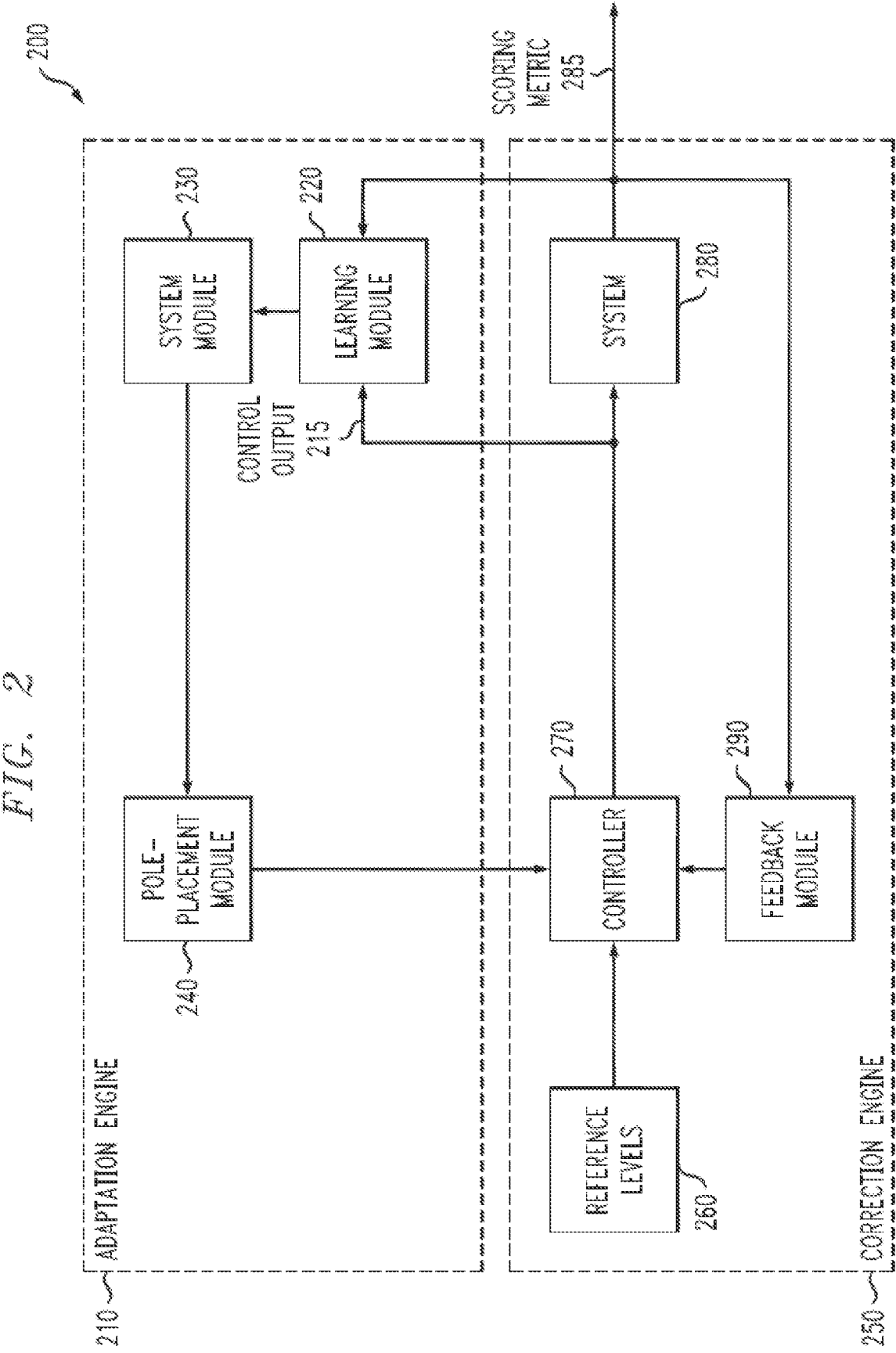
FIG. 2 illustrates a block diagram of an exemplary adaptation-correction system, according to some embodiments.

FIG. 2 illustrates a block diagram of an exemplary adaptation-correction system 200, according to some embodiments. As shown in FIG. 2, the exemplary adaptation-correction system 200 comprises two structures, namely, an adaptation engine 210 and a correction engine 250.

Generally, the exemplary adaptation engine 210 aims to map decisions and responses in order to get a transfer function between allocations and a given SLA metric, as discussed further below in conjunction with FIG. 4A. The exemplary adaptation engine 210 comprises a learning module 220, a system model 230, and a pole-placement module 240, discussed below in conjunction with FIG. 3. The learning module 220 processes a control output 215 from the correction engine 250, such as the amount of resources added (u(k)), and a scoring metric 285, such as a response time of a particular processing step.

Likewise, the exemplary correction engine 250 suggests changes to the allocated amount of resources in order to ensure satisfaction of the SLA, as discussed further below in conjunction with FIG. 5. The exemplary correction engine 250 generates a current value of a scoring metric 285 and comprises a set of reference levels 260, a controller 270, a system representation 280 and a feedback module 290, discussed below in conjunction with FIG. 3.

Figure 3:
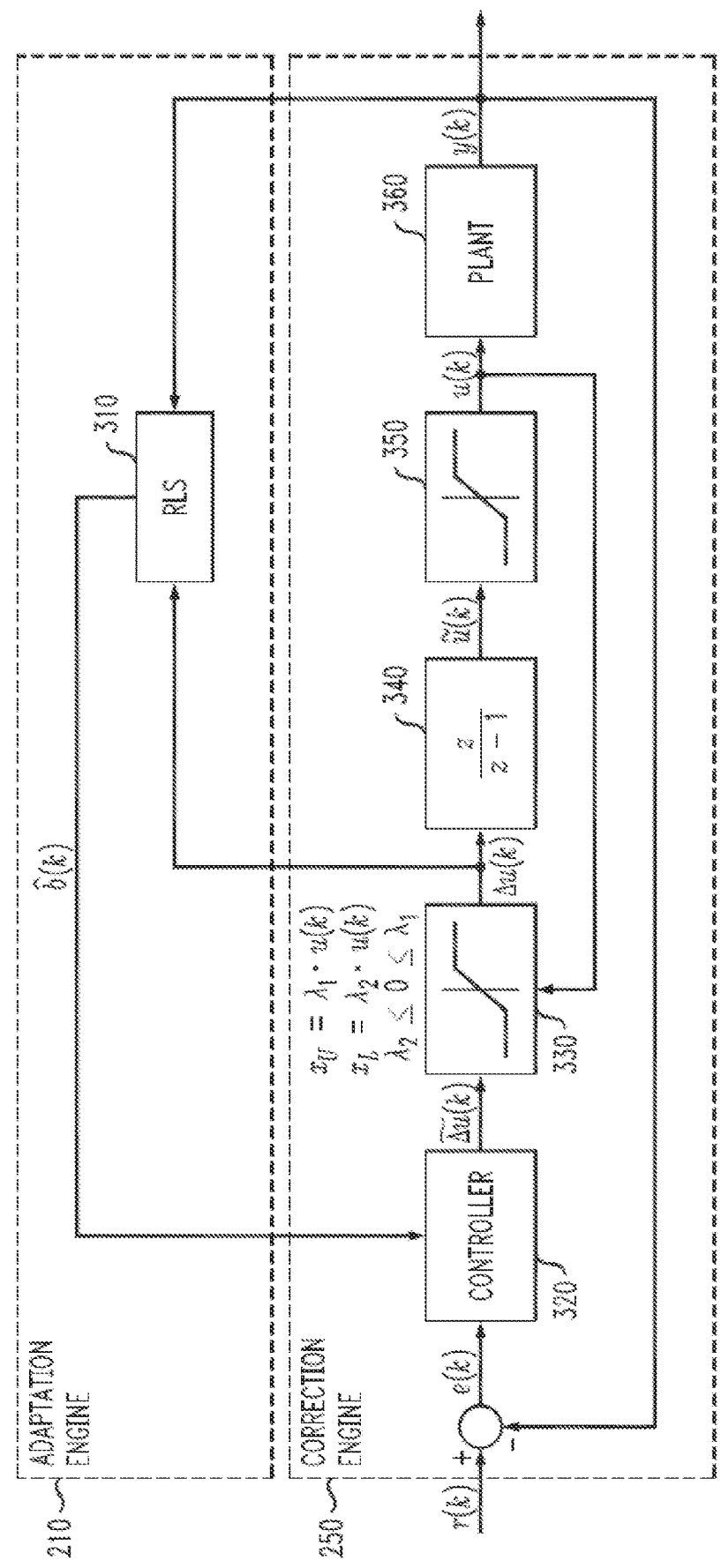
FIG. 3 illustrates an exemplary implementation of the adaptation-correction system of FIG. 2 in further detail, according to one or more embodiments of the disclosure.

FIG. 3 illustrates an exemplary implementation 300 of the adaptation-correction system 200 of FIG. 2 in further detail, according to one or more embodiments of the disclosure. In at least one embodiment, the adaptation engine 210 and the correction engine 250 work in tandem to ensure satisfaction of the SLA and perform simultaneous actions.

Adaptation Engine 210

As shown in FIG. 3, a Recursive Least Squares (RLS) module 310 in the adaptation engine 210 learns system parameters b(k), which are generated by the relation between the amount of resources added (u(k)) and the response time of the particular step y(k)).

The adaptation engine 210 may not be needed if a dynamic between resource allocation and a given SLA metric could be defined for each workload and this dynamic was the same or, at least, very similar. Since this typically cannot be assumed for each resource allocation-SLA metric pair, a learning step is needed. Even in the same job, multiple kinds of workloads might generate different allocation dynamics.

The dynamic relation between resource allocation and SLA metric is represented by Equation (1), below. It can be assumed, however, that these relationships can be mapped by a first order differential equation, as shown by X. Liu et al., "Adaptive Entitlement Control of Resource Containers on Shared Servers," IFIP/IEEE International Symposium on Integrated Network Management, 163-76 (May 2005), incorporated by reference herein in its entirety.

$$x(k+1)=a \cdot x(k)+b \cdot u(k) \tag{1}$$

Equation (1) is a first-order differential equation with parameters to be discovered used as a system model for the relation between resource allocation and SLA metric In Equation (1), a and b are the parameters to learn, which can be learned using any regression algorithms. The parameter a represents the current SLA metric observation, whereas b represents the effect of a different allocation u(k).

The output of the RLS module 310 is a parametrized system model, b(k), that will be used by the pole-placement module 240 in the adaptation engine 210 (where b is applied to the controller 320). The pole-placement module 240 ensures a desired closed loop dynamic between the system input (the amount of allocated resources, r(k)) and the output, y(k) (a value of a given SLA metric).

Correction Engine 250

As shown in FIG. 3, the correction engine 250 works by receiving feedback of the execution conditions, y(k), (typically, a given SLA metric) as well as the current learned model, b(k), generated by the RLS module 310 of the adaptation engine 210, as discussed hereinafter. The correction engine 250 uses this information to calculate the pole placement of the closed loop system. The pole placement calculation can be performed using Laplace Transforms, for example, when the differential equations are linear and with a finite order, or by using machine learning algorithm(s) in the more general cases, since a neural network with hidden layers is a universal approximator. See, for example, K. Hornik, "Approximation Capabilities of Multilayer Feedforward Networks," *Neural Networks*, Vol. 2, No. 4, 251-57 (1991), incorporated by reference herein in its entirety.

As shown in FIG. 3, a controller 320 takes the parameter b(k) learned by the adaptation engine 210 and uses the parameter, $\hat{b}(k)$, to modify the feedback loop dynamics, which is fed by (r(k)−y(k)=e(k)), where r(k) is a target value of the scoring metric 285 of interest, such as a target response time, and y(k) is the current value of the scoring metric 285, such as the response time of the particular step, to obtain an error, e(k).

The relation of the amount of resources added (u(k)) and the response time of the particular step y(k) is assumed to be piecewise linear, and a saturation module 330 is added after the controller 320 in order to bound the error between the assumed dynamics and the actual dynamics. In some embodiments, the saturation module 330 is adaptive as well, and has two parameters, $\lambda_1$ and $\lambda_2$, as shown in FIG. 3. These two parameters, $\lambda_1$ and $\lambda_2$, are associated with a trade-off between allowed oscillation around the set-point and convergence rates. The smaller the absolute value of these parameters are, the less the system representation 280 will oscillate, but convergence will be slower. An example of a particular parametrization of both parameters, $\lambda_1$ and $\lambda_2$, is discussed below in a section entitled "Example."

In the embodiment of FIG. 3, the system representation 280 of FIG. 2 is implemented using an integrator block 340, a saturation block 350 and a plant block 360. As shown in FIG. 3, the output of the saturation module 330 is processed by the integrator block 340, represented by the equation $$\frac{z}{z-1},$$

representing an integrator block in the Z-transform domain. The integrator block 340 represents that, in some embodiments, the output from the controller 320 and initial saturation module 330 is an increment in the current allocation, rather than a full allocation. To illustrate, suppose an allocation at time instant k is x(k)=4.1, the control output from the saturation module 330 is u(k)=0.1 and model parameter a=1. A next allocation according to equation (1) will be x(k+1)=4.1+0.1=4.2, instead of just 0.1, which means that the integrator block 340 will sum the contribution of the current control output, u(k), to the current allocation to obtain a new allocation.

The output of the integrator block 340 is processed by saturation block 350, which prevents the allocation from exceeding the amount of available resources (e.g., processing cores, memory or network bandwidth available) of the device. Thus, the inferior limit of the saturation block 350 is 0 in most implementations and the superior limit of the saturation block 350 is MAX_RESOURCE, where MAX_RESOURCE is the number of processing cores, amount of memory or amount of network bandwidth available of the device, depending on the resource that is being controlled (computation, memory or network, respectively). Finally, the plant block 360 translates the allocation, x(k), into a new SLA metric, y(k). In other words, the plant block 360 is typically implemented as a highly nonlinear function modeled as a first-order differential equation that continually learns the system model, $\hat{b} \sim b$, at each iteration.

For a more detailed discussion of the adaptation-correction system 200 of FIGS. 2 and 3, see, for example, U.S. patent application Ser. No. 16/400,289, filed May 1, 2019, entitled "Adaptive Controller for Online Adaptation of Resource Allocation Policies for Iterative Workloads Using Reinforcement Learning," incorporated by reference herein in its entirety.

Adaptation of Resource Allocation for Multiple Workloads

In one or more embodiments, a model is provided characterizing the dynamics of the workload execution. The disclosed model does not need to be perfect, but flexible enough to be adaptable to a wide range of workloads. To this end, a first order model that relates the SLA metric to allocations is assumed to be good enough if adapted online. See, for example, X. Liu et al., "Adaptive Entitlement Control of Resource Containers on Shared Servers," *IFIP/IEEE International Symposium on Integrated Network Management*, 163-76 (May 2005), incorporated by reference herein in its entirety. In summary, it is assumed that the dynamics that relate allocations with SLA metrics are from the kind:

$$s_i(k) = s_i(k-1) + b_{1i}\Delta u_i(k) - b_{2i}\Sigma_{j \neq i} u_j(k) \tag{1}$$

where s(k) is the SLA metric of interest in step k, $b_{1i}$ is the term that relates the self-allocation of workload i with respect to the target SLA metric, $b_{2i}$ is the term that accounts for interference of an allocation to other workloads with respect to the target SLA metric, $u_i(k)$ is the amount of a particular resource allocated at a step k.

In some embodiments, an automatic mechanism is provided to control multiple iterative workloads from a single machine in which the workloads share resources. This control assumes no prior knowledge of such workloads and aims to stabilize these in the long run with respect to the SLA metrics. The controller takes three pieces of information as inputs:

the current SLA metric measured at the time of the control;

the previously measured SLA metric; and the amount of CPU spent by all the other concurrent workloads.

This applied information is used to fit a linear control that cancels the dynamic, a deadbeat control that cancels both the direct dynamics (e.g., the dynamics related from allocation $r_i$ to workload AO and the interferences (e.g., the dynamics related from allocations $r_j$ to workload $w_i$, j≠i). This controller extends a controller disclosed in U.S. patent application Ser. No. 16/400,289, referenced above, with a new term to cancel possible effects from interferences. The control law for workload $w_i$ is, then:

$$u_i(k) = \frac{1}{k_c \cdot \hat{b}_{1i}} \cdot e_i(k) + \hat{b}_{2i} \sum_{j \neq i} u_j(k)$$

$$e_i(k) = s_i(k) - s_i(k - n + 1)$$

where n is the number of controlled workloads at the point in time k.

Figure 4A:
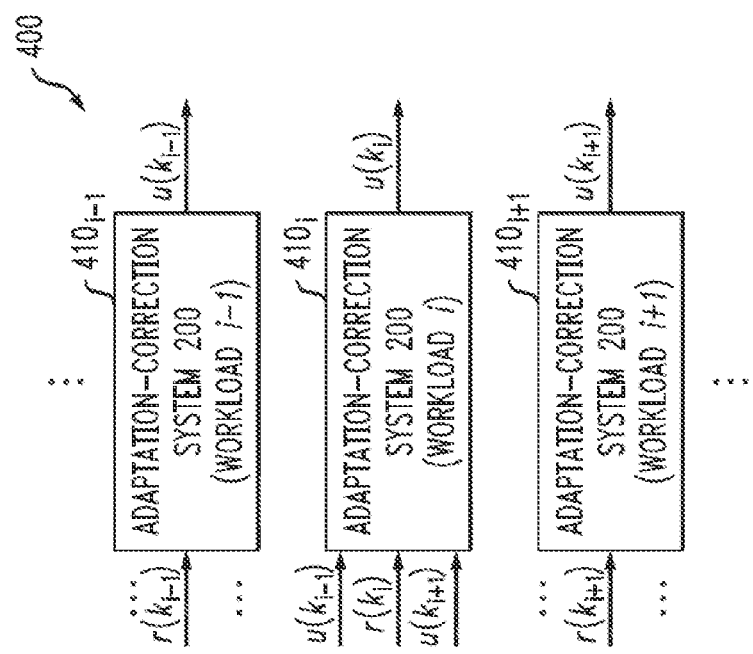
FIGS. 4A and 4B illustrate the adaptation-correction system of FIGS. 2 and 3 in further detail for multiple workloads, according to embodiments of the disclosure.

FIG. 4A illustrates an implementation 400 of the adaptation-correction system of FIGS. 2 and 3 in further detail for multiple workloads, according to embodiments of the disclosure. As shown in FIG. 4A, the implementation 400 comprises a plurality $410_{i-1}$ through $410_{i+1}$ of the adaptation-correction systems 200 of FIG. 2, each corresponding to a particular workload i−1 through i+1.

In the embodiment of FIG. 4A, the adaptation-correction system $410_i$ associated with workload i receives as inputs 410 (target value of the scoring metric 285 of interest, such as a target response time), and the amount of resources added for the other workloads (e.g., $u(k_{i-1})$ and $u(k_{i+1})$). The adaptation-correction system $410_i$ associated with workload i determines a new amount of resources to add for the current workload (i).

The adaptation-correction systems 410 associated with the other workloads (other than workload i) operate in a similar manner as the illustrated adaptation-correction system $410_i$ for workload i.

Figure 4B:
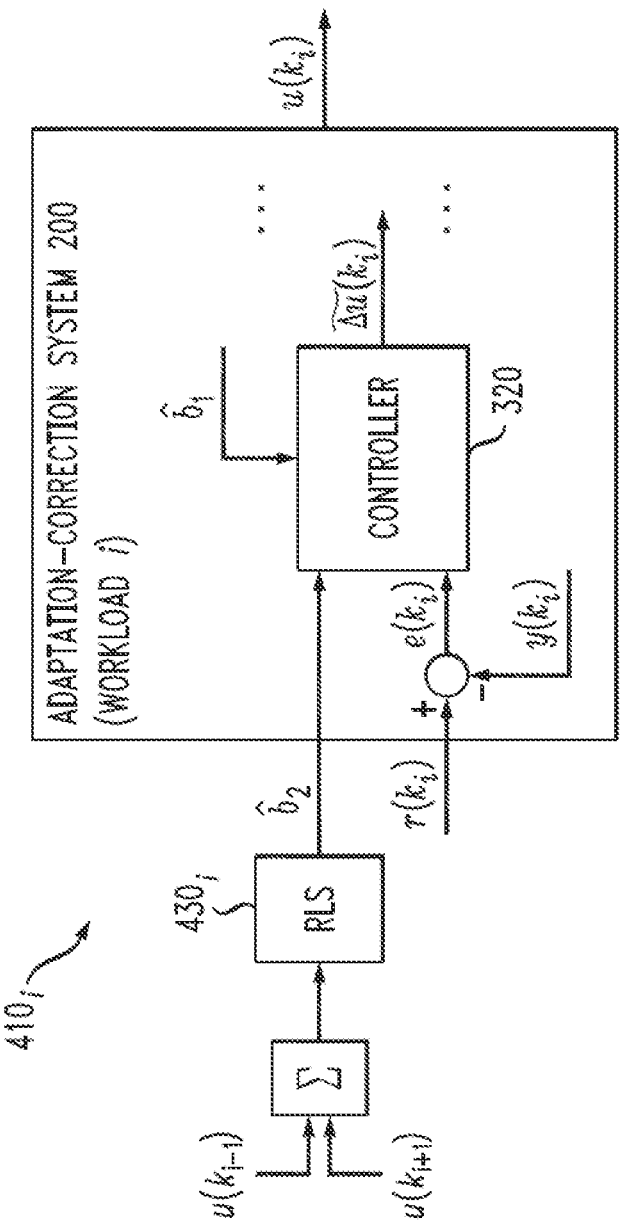

FIG. 4B illustrates the adaptation-correction system $410_i$ associated with workload i of FIG. 4A in further detail, according to an embodiment of the disclosure. As shown in FIG. 4B, the adaptation-correction system $410_i$ comprises the controller 320 of FIG. 3 (as well as the other elements of the adaptation-correction system of FIGS. 2 and 3, which have been omitted for ease and clarity of illustration but operate in a similar manner as described above for the adaptation-correction system of FIGS. 2 and 3).

As shown in FIG. 4B, the controller 320 takes the parameter b(k) learned by the adaptation engine 210 and uses the parameter, b(k), to modify the feedback loop dynamics, which is fed by (r(k)−y(k)=e(k)), where r(k) is a target value of the scoring metric 285 of interest, such as a target response time, and y(k) is the current value of the scoring metric 285, such as the response time of the particular step, to obtain an error, e(k).

In addition, the adaptation-correction system $410_i$ comprises a summer $420_i$ to sum the allocations of the concurrent workloads (other than workload i) and uses a Recursive Least Squares (RLS) 430 for adaptation. RLS is a good choice for iteratively fitting a linear model, which is the case. Fitting successive linear models is faster than fitting non-linear models and can reasonably emulate these non-linearities with fast enough adaptation cycles.

As stated previously, the direct impact of changing allocations to a particular workload are considered, as well as the interference caused by other workloads.

Because there are two different metrics influencing the behavior of the workload performance, which is measured by the SLA metrics, three different actions are performed:

1. adapt the parameter of self-allocation to SLA metric relationship;
2. adapt the interference parameter; and
3. control the workload (e.g., change the allocations to reach the desired SLA metric).

There may be a conflict between the two first necessities. If both metrics are adapted concomitantly, it is not possible to know if a change in the SLA metric occurred due to a change in the allocation for that particular workload (i.e., a self-allocation change) or due to changes in other allocations, which caused more or less interference.

In one or more embodiments, the disclosed solution alternates these actions. It is believed that in many cases the self-allocation parameter is more relevant to the SLA metric than interferences, and, thus, more data points are used to adapt the self-allocation parameter to obtain a more stable configuration.

This is done by dividing the full control process into n steps, where n is the number of monitored/controlled workloads at a moment in time. (n−1) steps are used to collect enough data to adapt the self-allocation parameter, $\hat{b}_{1i}$, and the other remaining step is used to adapt the interference parameter, $\hat{b}_{2i}$, and apply the control law with both learned parameters.

FIG. 5 illustrates an exemplary cycle 500 of an alternating control/adaptation schema for adapting a resource allocation for multiple workloads (1 through n), according to some embodiments. The adaptation engine 210 (FIG. 2) adapts with respect to self-allocation for n−1 steps (e.g., steps 1 through n−1) after it changed its allocation. One step after that (step n), the adaptation engine 210 changes the allocation of this workload and the cycle restarts. The steps are sampled every h milliseconds in this example.

In comparison with a naive approach, the disclosed resource allocation method for multiple workloads 'skips' n−1 steps of control allocation for each workload. Since steps are sampled every h milliseconds, in some embodiments, this means that n×h milliseconds will pass before a workload performs control allocation again. For example, in FIG. 5, the resource allocation of workload 1 will be controlled in step 1 and then again only at step (n+1), instead of at every step. This impacts a convergence time of workload 1, (convergence here defined as being close enough to the set-point, e.g., step when iteration time reaches set-point within an acceptable percentage), in proportion to the number of competing workloads n. The impact of this delayed (and reduced number of) actuations for each workload in the convergence time is reasonably small enough to justify the approach (especially in cases where n is small, no discernable effect is observed on the convergence time).

The disclosed approach also leverages a mechanism to deal with the insertion and removal of workloads in an online fashion (e.g., meaning that the controller can be deployed as a continuously running process that deals with new workloads and finished workloads transparently). A mechanism is employed that keeps a list of active workload indexes $w_{idx}$ to be controlled and monitored. The list of active workload indexes $w_{idx}$ is updated in between cycles in order to avoid the impact of the interferences of newly added workloads in a workload that has not been controlled or adapted in a while.

The approach shown in FIG. 5 'skips' n−1 steps of control allocation for each workload, which has numerous advantages such as different time-spans for learning interference and self-allocation parameters, which lead to better control quality.

One or more aspects of the present disclosure recognize that since steps are sampled every h milliseconds, there are n×h milliseconds that will pass before a workload performs control allocation again in the cyclic approach. For example, the resource allocation of workload 1 in FIG. 5 will be controlled in step 1 and then again only at step (n+1), instead of at every step. This impacts a convergence time of workload 1 in proportion to the number of competing workloads n.

While the impact of this delayed (and reduced number of) actuations is reasonably small for a small number of concurrent workloads, the approach shown in FIG. 5 may suffer with scalability, since the number of control actions performed in a workload is directly proportional to the number of workloads in a cycle, assuming a fixed sampling rate.

U.S. patent application Ser. No. 16/554,910, filed Aug. 29, 2019, entitled "Early-Convergence Detection for Online Resource Allocation Policies for Iterative Workloads," (now U.S. Pat. No. 11,113,171) incorporated by reference herein in its entirety, provides an early-convergence detection mechanism to allow for controlling more concurrent workloads, in some embodiments, all the while mitigating the delay in the convergence time caused by additional workloads. This mechanism receives the metrics of each workload at each iteration and ranks them at the end of a cycle. Afterwards, it decides which workloads will be controlled in the next cycle.

The exemplary ranking algorithm works by categorizing each workload in terms of closeness to the set-point. The modulus of Relative Error is used in some embodiments as a ranking metric. This error is calculated through the equation:

$$e_{s_i} = \frac{|s_i(k) - r_i(k)|}{r_i(k)} \quad (1)$$

At the end of a cycle, each workload presents an error metric. This error is compared to a predefined convergence threshold. This threshold is defined in one or more embodiments by the operator and represents the tolerance for which the workload is assumed to be converged.

Workloads whose error is smaller than the threshold are considered converged. Converged workloads are removed from the control cycle, similarly to finished workloads.

A converged workload might not remain converged until termination for a number of reasons, which include natural oscillation of times, interference due to new workloads, heavy adjustment in other running workloads allocations, amongst others. This is why the convergence checking is applied to all workloads, monitored and controlled, at the end of each cycle. If a workload in the monitored list has errors above the predefined threshold, it is re-inserted into the control cycle, at the end of the list.

One or more embodiments of the present disclosure estimate an initial resource allocation for the dynamic resource controller. The disclosed exemplary approach considers the features of iterative workloads, such as the number and size of layers for DNN training workloads, or the discretization of the parameter space of a Hough Transform for Lane detection workflow, among others. By using an updatable regression model, the initial resource allocation can be estimated for each workload. As discussed above, one issue is that if the amount of allocated resource is below or above what was expected, it will take more time to converge, leading to a possible SLA infringement or a waste of resources.

Resource Allocation Estimation

In one or more embodiments, a dataset with data from previous iterative workload executions of each workload is used as an input. Such data comprises different allocations and parametrizations of the workload.

FIG. 6A illustrates an exemplary input dataset 600 for an exemplary DNN training workload, according to an exemplary implementation. As shown in FIG. 6A, the exemplary input dataset 600 for the DNN training workload comprises information about the infrastructure where the workload was executed (e.g., GPU/CPU 610, and number of processing cores 620) and features such as batch size 625, input size 630 and number of epochs 635.

FIG. 6B illustrates an exemplary input dataset 650 for an exemplary lane detection workload, according to another exemplary implementation. As shown in FIG. 6B, the exemplary input dataset 650 for the lane detection workload comprises information about the infrastructure where the workload was executed (e.g., GPU/CPU 655, and number of processing cores 660) and features such as input image size 665, discretization of parameter space 670 and threshold for edge detection 675.

Figure 7:
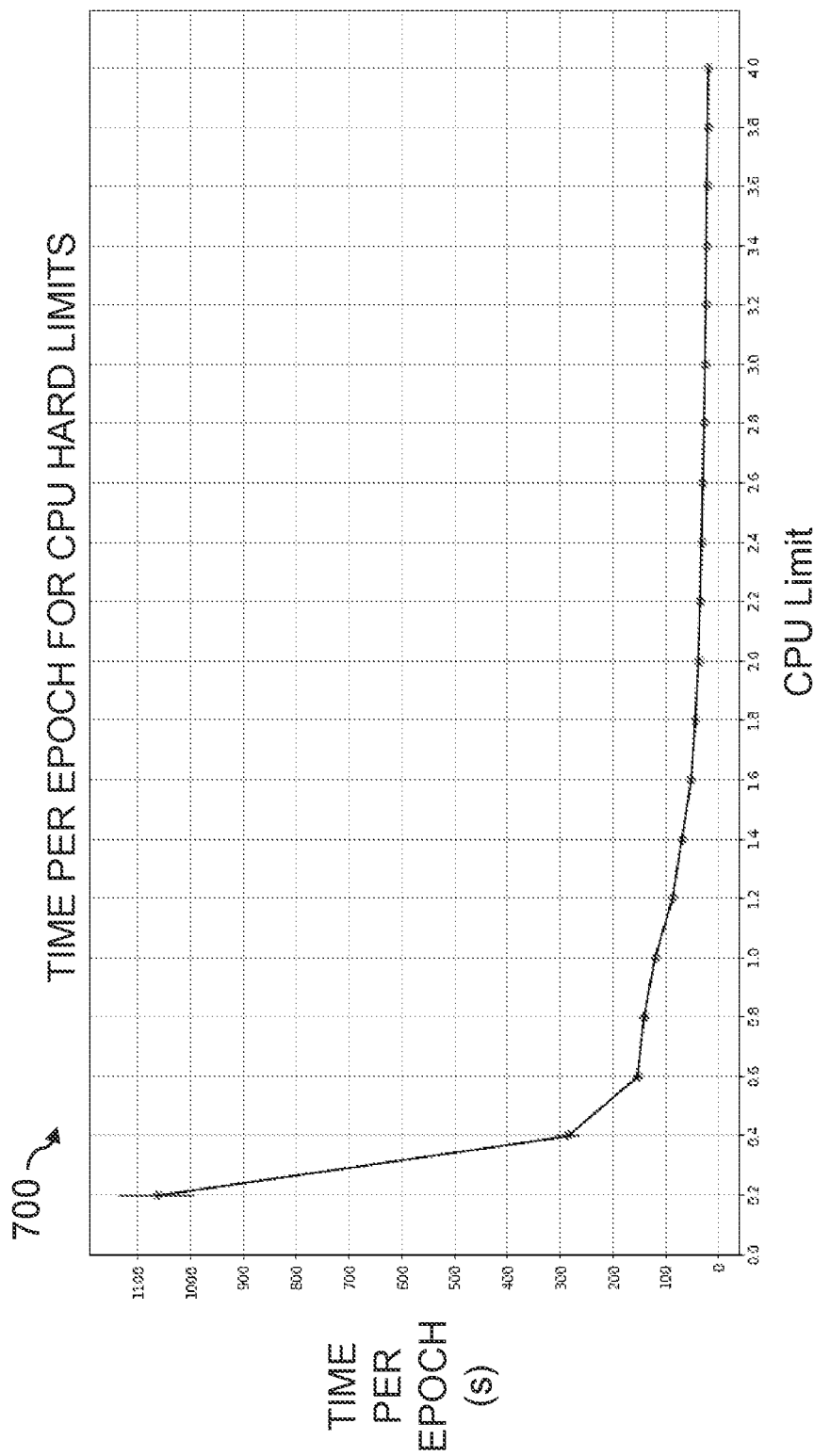
FIG. 7 illustrates an exponential relationship between a time per epoch (or frame) for a given workload and a CPU limit for the given workload, according to some embodiments of the disclosure.

FIG. 7 illustrates an exponential relationship between a time per epoch (or frame) for a given workload and CPU limit for the given workload, according to some embodiments of the disclosure. The relation between the time per epoch (or frame) and CPU limit in the context of DNN training and lane detection, respectively, is guided by the exponential curve 700. Thus, one or more aspects of the present disclosure recognize that a non-linear regression to the exponential curve 700 is a well-suited model to characterize the workload behavior. This shape is not specific for these workloads, as it is derived from Amdahl's Law, which makes the approach described herein general enough for iterative workloads. Thus, a model can be estimated using exponential regression.

As an embodiment of this approach, non-linear least squares is used as one of the model options to fit the data to the function, as follows:

$$f(x) = y = \frac{\log a - \log(x - c)}{b}, \quad (2)$$

where a, b and c are the parameters to be estimated, x corresponds to the observations of features for each workload (e.g., specific workload features, infrastructure features and execution time of each workload) and y corresponds to the desired initial allocation needed by each workload. This regression of equation (3) is one example that works for a single feature, but generalization to more features is straightforward, as would be apparent to a person of ordinary skill in the art.

Initial Allocation for Dynamic Controllers

Given a representation of an SLA, the workload features and a target infrastructure, an initial allocation can be computed using the disclosed techniques, by using the regressor detailed in the previous section. As mentioned above, a good initial allocation leads to a non-infringing SLA and a non-overconsuming resource workload execution.

A naïve approach for estimation consists of using an equal-share, workload-independent resource allocation. This leads to immediate problems if the amount of allocated resources is not suitable for the workload features, and it is worsened as the workloads are more unbalanced. In addition, consider the situation of managing the resources per workload. For example, if there are 100 resource units (e.g., RAM Megabytes (MB)) equally divided by 10 workloads, each workload will receive 10 MBs. If a new workload is started, this new workload will have to wait until another workload is done. Another immediate consequence is that the new workload will receive only 10 MBs of RAM.

The prediction of resource allocation for workloads is a common task for provisioning policies. The disclosed approach is based in models such as an exponential regressor and is appropriated for Theory of Control-based approaches, since it can provide a good initial estimate for the resource allocation and, after that, dynamically control the amount of allocated resources, also optionally considering the interference of other workloads.

It is noted that for the early-convergence approaches referenced above, the disclosed approach is even better, since it reduces the time needed by the controllers to converge. One standard in error metrics for dynamic control problems is the Integral of Time Absolute Error (ITAE), which penalizes errors at the end of an execution more heavily than errors in the beginning. While this is (i) an important error metric to assess controller power of stabilization and (ii) is widely used for classical control problems, in the scenario of SLA compliance, errors in the beginning are as much of a concern as errors at the end of an execution. It is important, then, to have a proper error metric to score the performance of the execution, complementary to the one that assesses the performance of the controller in terms of stability.

In such a scenario, a percentage of time within n % error is a good overall metric, that provides good robustness guarantees that will guide set-point setting for a SLA. For instance, for a given confidence threshold (e.g., 95%), how much of a deviation is needed from the SLA can be inspected when setting the set-point to be able to be compliant.

Model Selection and Generation

In one or more embodiments, the disclosed method continuously monitors the workloads for the adaptation of resources. With increasing amounts of data about a workload or small variants of it (changing, for instance, some input parameters), more data tuples are gathered with $X=(s_i, P_i, w_i)$ and $y=a_i$, where $s_i$ is the measured SLA metric at iteration i;
$P_i$ is the set of input parameters used for the execution;
$w_i$ corresponds to the class of workload (e.g., Neural Network Training, Image Processing, etc); and
$a_1$ is the amount of the controlled resource a allocated at iteration i.

This increasing number of tuples allows generation of more sophisticated regression algorithms (e.g., models) over time, if necessary. When few samples are available, simple models must be used. When more samples become available, that can be the trigger for the training and generation of more complex models, which require more data, as would be apparent to a person of ordinary skill in the art.

For example, suppose that a library of four kinds of models is available, as shown in Table 1. It can be shown that a useful rule of thumb is to have a number of observations at least 10 times higher than the number of parameters. Using this heuristic, a decision process can be applied through which the generation of a model is triggered with increased complexity when the appropriate number of observations is reached.

TABLE 1 provides an exemplary model library with associated complexity, number of parameters and observations needed:

| Model | Complexity | # Parameters | # Observations |
|---|---|---|---|
| Non-Linear Regression | 0 | 3 | 30 |
| Regression Tree | 1 | 20 | 200 |
| Random Forest | 2 | 200 | 2000 |
| Neural Network | 3 | 10000 | 100000 |

The same heuristic can be used directly as a model selection process. By the time more observations are gathered, the most complex model available we be selected, depending on the domain definition.

Alternatively, the library of models in Table 1 could optionally be enhanced with the tracking of an accuracy of models over time. This would allow an alternative decision process to use the most fitting model. This tracking of accuracy metrics over time also allows the "refreshing" of models in the library. If a model degrades, for example, due to model drift, the model can be retrained with the appropriate number of observations.

Preemptive Interference Avoidance

In equation (1) above, a parameter is estimated that relates to self-allocation, $\hat{b}_{1i}$, and another that relates to interference caused by other workloads $\hat{b}_{2i}$. This interference parameter can be used in one or more embodiments in conjunction with the methodologies previously described to avoid interference effects when a new workload is deployed.

For example, suppose two workloads are already running and they are with current allocations $a_1=3.1$ cores and $a_2=2.4$ cores. These workloads have current interference parameter estimates of $\hat{b}_{21}=0.05$ and $\hat{b}_{22}=0.025$. If a third workload needs to be deployed and its current estimation model gives a recommendation of $a_3=4.4$ cores, the quantities can be preemptively increased for $\Delta a_1=4.4 \cdot 0.05=0.22$ and $\Delta a_2=4.4 \cdot 0.025=0.11$, even before workload 3 executes anything. This will prevent workload 3 from disrupting executions of workloads 1 and 2 even before interference occurs.

This feature also aids already converged workloads to not leave the convergence band, thus increasing even more the number of possible workloads to be controlled at once. It also supports the deployment of the controller mechanism as a continuously-running background process, adapting the resource allocation of newly deployed workloads and taking into consideration the interference they cause on any workloads already running.

In one exemplary implementation, the disclosed techniques for resource allocation with initial condition setting can be employed for the training of deep neural networks for five different workloads, labeled 0 through 4. These configure iterative workloads in which the resource constraints are known (e.g., only the adaptation of CPU cores is addressed). It is noted, however, that this restriction is not part of the disclosure, which presumes in some embodiments that different workloads could be bound—and thus adapted—regarding different computation resources, including GPU memory and an amount of dedicated stream processors.

Training Deep Learning models is a common task that is significantly resource intensive. The characteristic of the job is to be performed in fixed-size iterations, and each of these iterations receive the name of epoch. The number of training epochs is a parameter, which means the milestones of the job can be defined, and at each iteration, the rate of completion in percentage will be 100*i/n %, where i is the epoch number and n is the number of epochs specified. More granular milestones can be used in this particular example since processing each batch within an epoch is also a fixed size task, and that feature is used. Two different batches are assumed in some embodiments to take the same time to be processed if the machine state is similar. Thus, a batch or a collection of batches could also be used as the iteration to be controlled. A set point for the epoch was used, divided to find the set-point for a collection of k=100 batches and that set-point was controlled.

Figure 8:
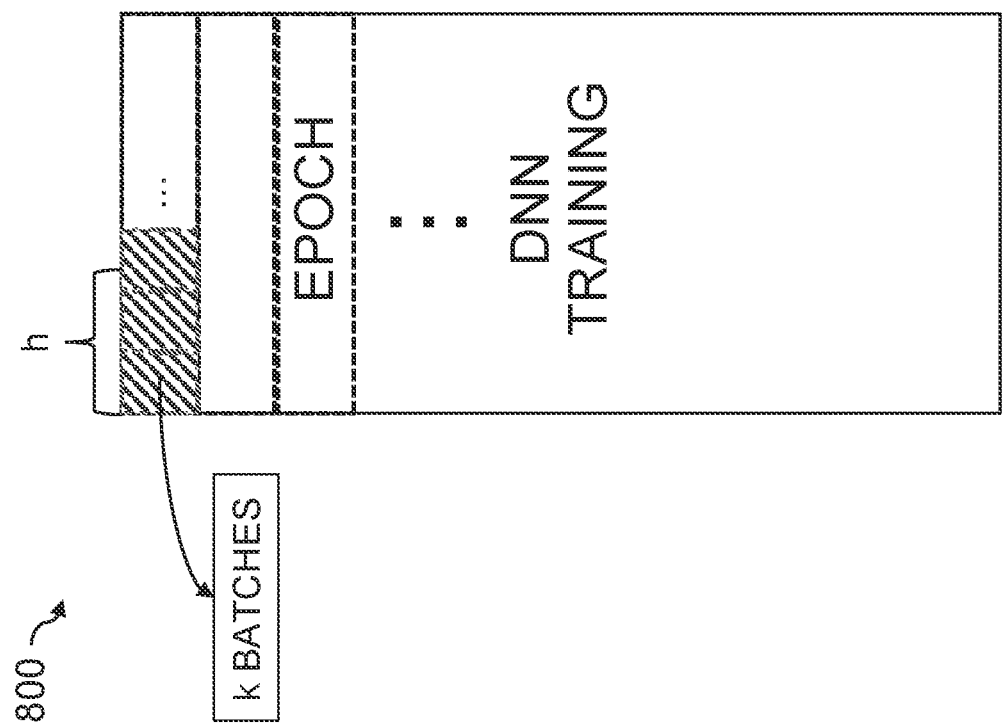
FIG. 8 illustrates a training of a deep neural network (DNN) as an iterative workload, itself comprised of multiple iterative workloads, according to one or more embodiments.

A set point for the epoch can be used, and divided to find the set-point for a collection of k=100 batches to control that set-point. FIG. 8 illustrates a training 800 of a deep neural network (DNN) as an iterative workload, itself comprised of multiple iterative workloads. Each training is performed in a collection of epochs, which are, by themselves, a collection of equal-sized batches (k batches). Assuming that an SLA metric to be controlled is the execution time (et=T), one can feedback the amount of time t it took to complete an epoch and compare this time to the desired time per epoch, which is T/n, and the desired time for each of the k batches, which is $T/(n*(n/k))=T \cdot k/n^2$. If a collection of batches took longer than $T \cdot k/n^2$ to finish, more resources might me be needed. On the other hand, if the time t is significantly smaller than $T \cdot k/n^2$, this indicates that the job does not need the current amount of allocated resources and reducing the allocation can decrease cost and even make room for other jobs to run.

Figure 9:
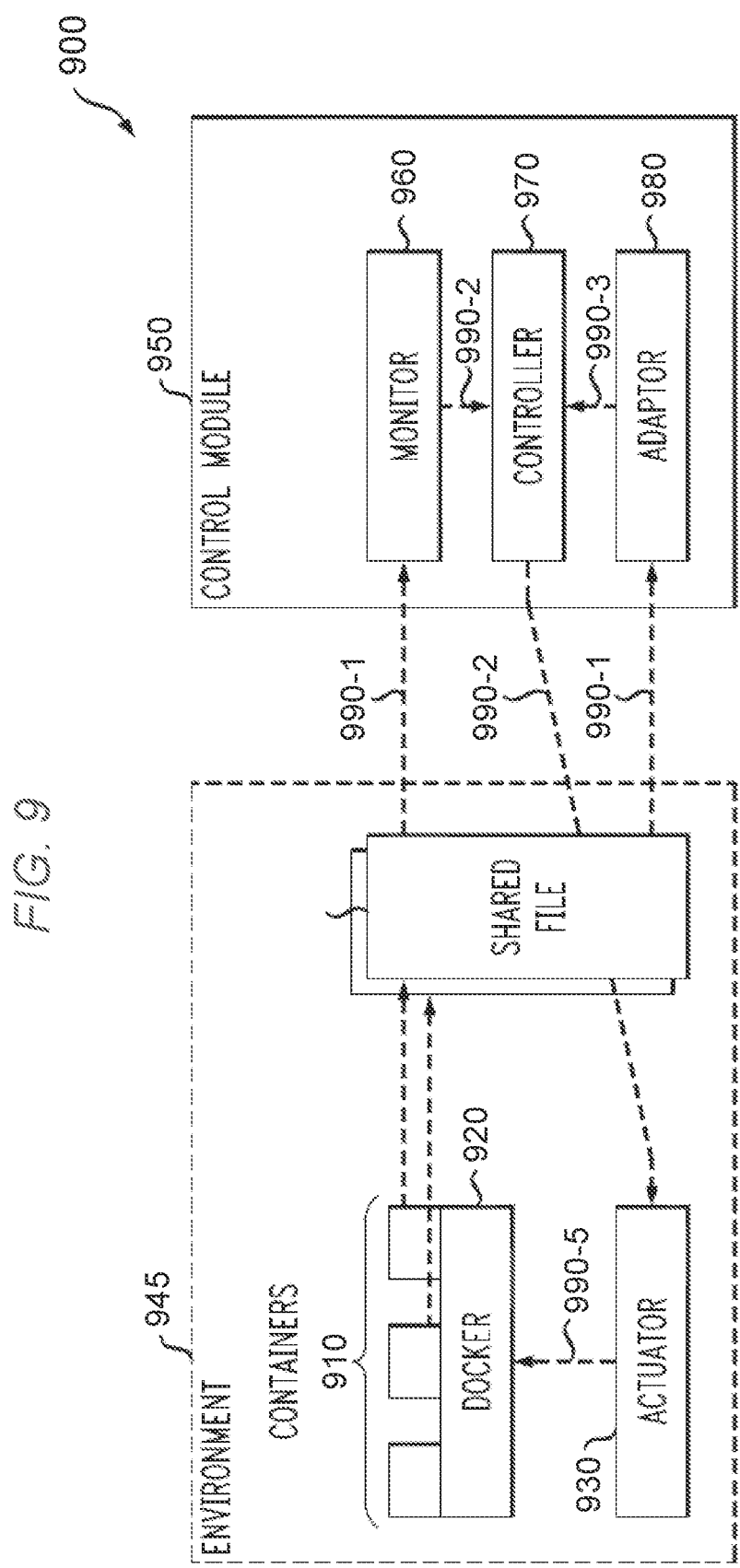
FIG. 9 illustrates an exemplary implementation of the disclosed resource allocation adaptation techniques for multiple workloads, according to some embodiments.

FIG. 9 illustrates an exemplary implementation 900 of the disclosed resource allocation adaptation techniques for multiple workloads, according to some embodiments. The exemplary implementation 900 uses a plurality of containers 910, such as Docker containers 920, which execute the iterative workloads in a shared execution environment, to implement the controller 270 of FIG. 2. Generally, Docker is a well-known lightweight container solution for multiple Operating Systems (OSs), offering controls over central processing unit (CPU) and memory limits. See, for example, D. Merkel, "Docker: Lightweight Linux Containers for Consistent Development and Deployment," Linux Journal, Vol. 2, 239 (2014), incorporated by reference herein in its entirety.

In one or more embodiments, one of the containers 910 is chosen as the controller container (corresponding to the system representation 280 of FIG. 2) and metrics are measured in real-time. Messaging between the Docker container 920 and a control module 950 is implemented in the embodiment of FIG. 9 using a shared file 940, in a known manner. The control module 950 comprises a monitor 960, a controller 970 and an adaptor 980. The exemplary monitor 960 is a possible implementation of the feedback module 290; controller 970 implements the elements in the correction engine 250 and the adaptor 980 implements the mechanisms in the adaptation engine 210 of FIG. 2, and operates in a similar manner as described above.

The containers 910/920, actuator 930 and shared file 940 are part of an environment 945. At the end of each iteration, the containers 910 send their performance metrics to a shared file 940, from which the monitor 960 and adaptor 980 are listening (e.g., using read operations 990-1 every h seconds). The monitor 960 takes the error metric and sends it to the controller 970 during step 990-2. Adaptor 980 infers a new parameter b and also sends it to the Controller 970 during step 990-3. Finally, the Controller 970 generates a new increment in allocation, which is sent to an actuation topic of shared file 940 during step 990-4. The actuator 930 is listening to this topic, and changes allocation when a new message arrives to update the containers 910 during step 990-5.

It has been found that using the disclosed cyclic controller with an early-convergence strategy together with the disclosed techniques for initial condition setting, leads to an overall improvement of the quality of the controller. When using the model-based initial condition setting, the first iterations of the workload during observations started inside a band defined by the error threshold (e.g., by using more accurate starting allocations, the dynamic changes vary less, which causes lesser interference variation). This allows control approaches to learn the "interference" of the other concurrent workloads faster.

For example, the workload with the lowest set point started within the convergence band even without the initial resource allocation estimation. However, due to the variation in the interference caused by the other workloads, the workload oscillated above and below the convergence band for a while. In experiments with the disclosed initial resource allocation estimation, since all workloads start closer to the actual set points, it suffers less variation in interference and never leaves the convergence band.

Figure 10:
FIG. 10 is a flow chart illustrating an exemplary implementation of a resource allocation adaptation process for multiple workloads with an initial condition setting, according to one embodiment of the disclosure.

FIG. 10 is a flow chart illustrating an exemplary implementation of a resource allocation adaptation process 1000 for multiple workloads with initial condition setting, according to one embodiment of the disclosure. As shown in FIG. 10, the exemplary resource allocation adaptation process 1000 initially obtains a dataset during step 1010 comprising data from previous executions of a workload, where the data comprises different resource allocations and parameterizations of the workload.

During step 1020, the resource allocation adaptation process 1000 determines an initial allocation of an amount of a resource for the workload based on a regression model characterizing behavior of the workload, the data, an SLA and a characterization of a target infrastructure.

Finally, the resource allocation adaptation process 1000 initiates an application of the determined initial allocation of the amount of the at least one resource for the workload during step 1030.

By considering features of an iterative workload to be executed in an infrastructure (e.g., the number of layers in a DNN, or parameter space discretization in a lane detection task) a better estimation of initial resource allocation is obtained for each workload, reducing the waste of resources, which impacts other running workloads in the same infrastructure as interference, or SLA infringement. The disclosed model generation and selection module considers that new observations can be stored and a simple heuristic can be used to determine which of the available models should be used; or whether a new model can be generated. It also allows for the refreshing of the models when drifting (decaying accuracy) is observed.

Among other benefits, the improved initial estimation of resource allocations provided by the disclosed resource allocation techniques causes smaller variations of resources, especially in the first control iterations. These smaller variations result in smaller variations of the interference between workloads, thereby facilitating the learning of the interference parameters by dynamic resource allocation controllers.

Control theory-based feedback to resource allocation, as employed by one or more embodiments, offers guarantees from control theory such as stability, resilience to disturbances and reference tracking. In addition, information from workload iterations can be employed to detect and remove workloads from the control cycle. Finally, the disclosed methodologies improve the convergence for all workloads, since the initial estimation should not be too far from the set point, assuming that the set point shall consider the Infrastructure/SLA feasibility.

In some embodiments, the disclosed techniques for adapting a resource allocation for multiple iterative workloads with initial condition setting reduce an amount of time needed to perform a resource allocation for such multiple iterative workloads. One or more embodiments of the disclosure provide improved methods, apparatus and computer program products for adapting a resource allocation for multiple workloads with initial condition setting. The foregoing applications and associated embodiments should be considered as illustrative only, and numerous other embodiments can be configured using the techniques disclosed herein, in a wide variety of different applications.

It should also be understood that the disclosed adaptive resource allocation techniques with initial condition setting, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for adapting a resource allocation for multiple iterative workloads with initial condition setting may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as an adaptation-correction system 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based resource allocation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. These platforms may also be used to implement at least portions of other information processing systems in other embodiments.

Figure 11:
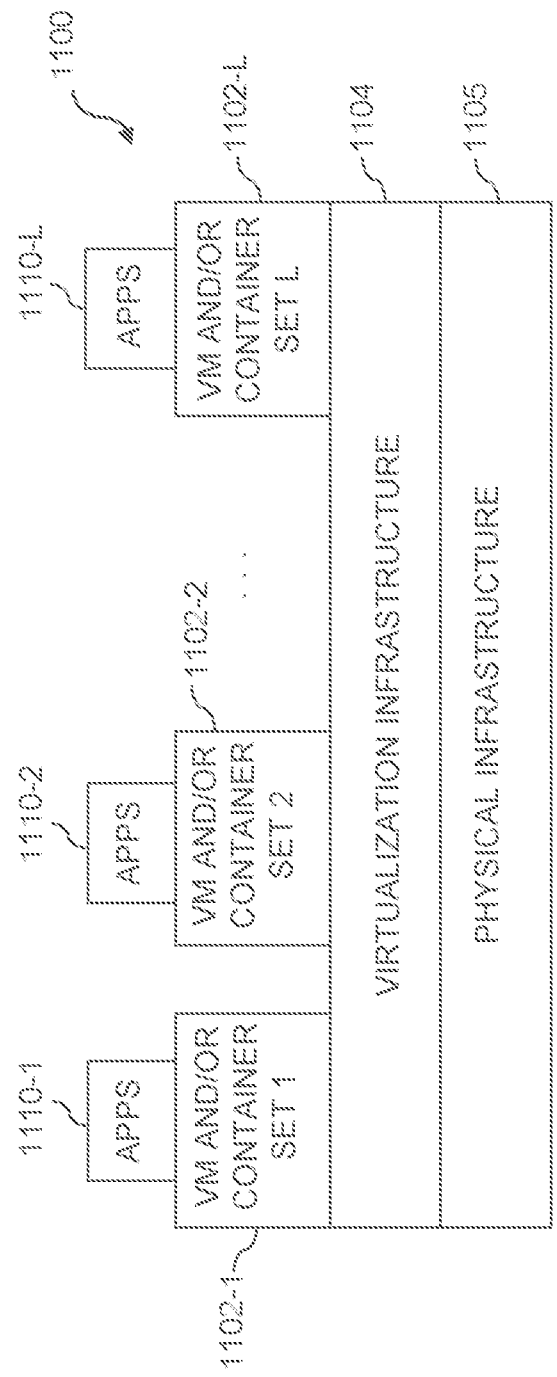
FIG. 11 illustrates an exemplary processing platform that may be used to implement at least a portion of one or more embodiments of the disclosure comprising a cloud infrastructure.

FIG. 11 shows an example processing platform comprising cloud infrastructure 1100. The cloud infrastructure 1100 comprises a combination of physical and virtual processing resources that may be utilized to implement at least a portion of the adaptation-correction system 200. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide resource allocation functionality of the type described above for one or more processes running on a given one of the VMs. For example, each of the VMs can implement resource allocation control logic for providing adaptive resource allocation for multiple workloads for one or more processes running on that particular VM.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide resource allocation functionality of the type described above for one or more processes running on different ones of the containers. For example, a container host device supporting multiple containers of one or more container sets can implement one or more instances of resource allocation control logic and for use in performing adaptive resource allocation for multiple workloads.

As is apparent from the above, one or more of the processing modules or other components of system 200 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises at least a portion of the given system and includes a plurality of processing devices, denoted 1202-1, 1202-2, 1202-3, . . . 1202-K, which communicate with one another over a network 1204. The network 1204 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1202-1 in the processing platform 1200 comprises a processor 1210 coupled to a memory 1212. The processor 1210 may comprise a microprocessor, a microcontroller, an application specific integrated circuit (ASIC), a field programmable gate array (FPGA) or other type of processing circuitry, as well as portions or combinations of such circuitry elements, and the memory 1212, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the given system may include additional or alternative processing platforms, as well as numerous distinct processing platforms in any combination, with each such platform comprising one or more computers, storage devices or other processing devices.

Figure 12:
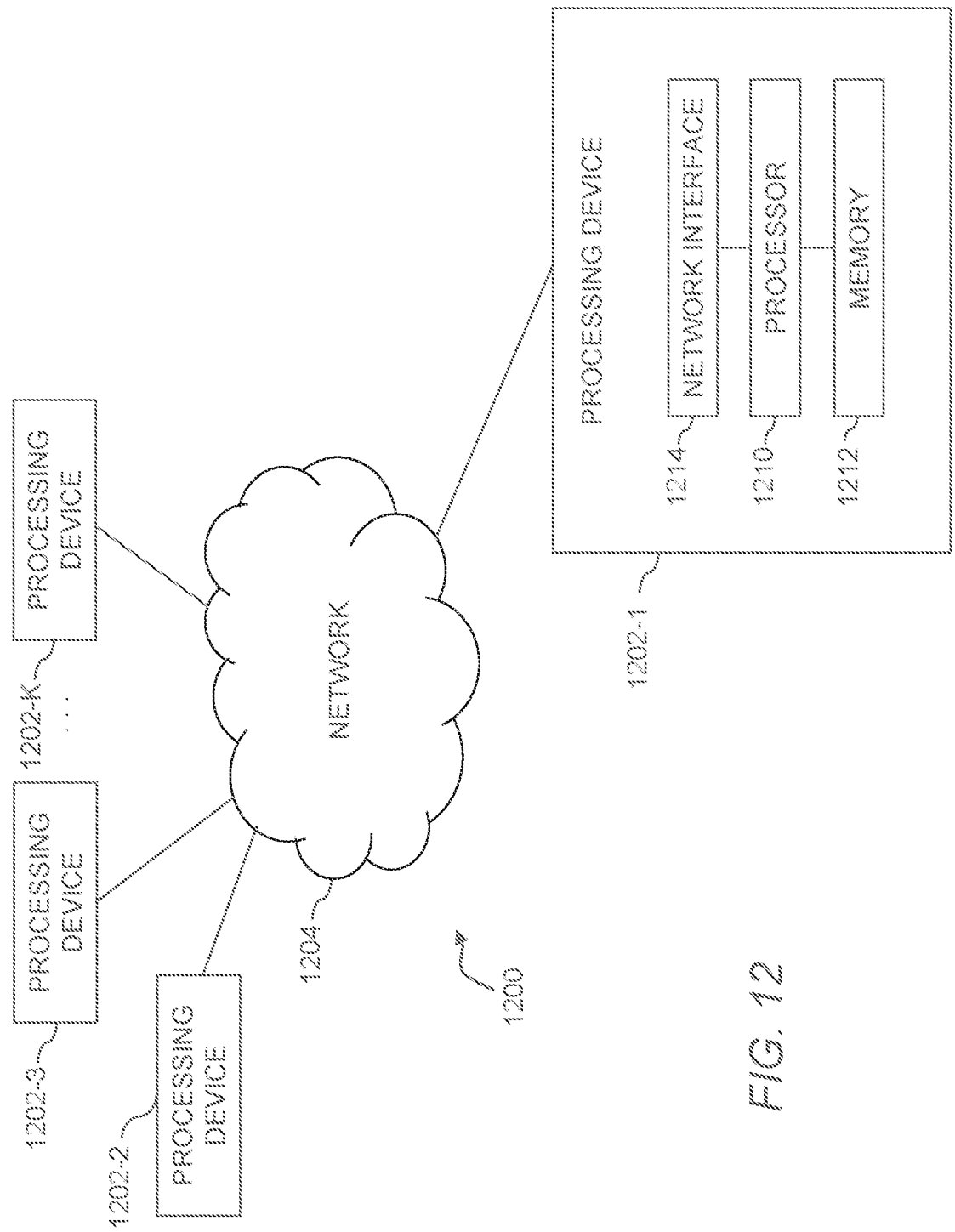
FIG. 12 illustrates another exemplary processing platform that may be used to implement at least a portion of one or more embodiments of the disclosure.

Multiple elements of an information processing system may be collectively implemented on a common processing platform of the type shown in FIG. 11 or 12, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:
1. A method, comprising:
obtaining a dataset comprising data from previous executions of at least one workload of a plurality of workloads, wherein the data comprises a plurality of different resource allocations for the at least one workload and a plurality of different parameterizations of one or more parameters that configure the at least one workload;

determining an initial allocation of an amount of at least one resource to be allocated to the at least one workload by applying, to a regression model characterizing a behavior of the at least one workload, (i) the data comprising at least some of the plurality of different resource allocations for the previous executions of the at least one workload and at least some of the plurality of different parameterizations of one or more parameters that configured the previous executions of the at least one workload, (ii) at least one predefined service metric for the at least one workload and (iii) a characterization of a target infrastructure where the at least one workload will execute;

initiating an application of the determined initial allocation of the amount of the at least one resource to be allocated to the at least one workload; and updating a complexity of the regression model with at least one additional parameter using new data for one or more additional executions of the at least one workload;

wherein the method is performed by at least one processing device comprising a processor coupled to a memory.

2. The method of claim 1, wherein the different resource allocations comprise one or more of a different number of processing cores in a computer processor, a number of different processing cores in a graphics processing unit, a different amount of memory and a different amount of network bandwidth.

3. The method of claim 1, wherein the determining of the initial allocation of the amount of the at least one resource for the at least one workload is performed substantially in parallel with an execution of the plurality of workloads.

4. The method of claim 1, further comprising evaluating a performance of one or more of the plurality of workloads based on a percentage of time within a predefined error range.

5. The method of claim 1, further comprising determining an adjustment to the initial allocation of the at least one resource for the at least one workload based at least in part on one or more of (i) a dynamic system model based on a relation between the amount of the at least one resource for the plurality of workloads and the at least one predefined service metric, (ii) an interference effect of one or more additional workloads of the plurality of workloads on the at least one workload, and (iii) a difference between an instantaneous value of the at least one predefined service metric and a target value for the at least one predefined service metric.

6. The method of claim 1, further comprising replacing the regression model over time with a different model using the new data for the one or more additional executions of the at least one workload.

7. The method of claim 1, further comprising a plurality of the regression models, and wherein an accuracy of each of the plurality of the regression models is evaluated over time to identify a most fitting model.

8. The method of claim 1, further comprising a plurality of the regression models, wherein an accuracy of each of the plurality of the regression models is evaluated over time and wherein at least one of the regression models is retrained when a predefined model degradation standard is violated.

9. A computer program product, comprising a tangible non-transitory machine-readable storage medium having encoded therein executable code of one or more software programs, wherein the one or more software programs when executed by at least one processing device perform the following steps:

obtaining a dataset comprising data from previous executions of at least one workload of a plurality of workloads, wherein the data comprises a plurality of different resource allocations for the at least one workload and a plurality of different parameterizations of one or more parameters that configure the at least one workload;

determining an initial allocation of an amount of at least one resource to be allocated to the at least one workload by applying, to a regression model characterizing a behavior of the at least one workload, (i) the data comprising at least some of the plurality of different resource allocations for the previous executions of the at least one workload and at least some of the plurality of different parameterizations of one or more parameters that configured the previous executions of the at least one workload, (ii) at least one predefined service metric for the at least one workload and (iii) a characterization of a target infrastructure where the at least one workload will execute;

initiating an application of the determined initial allocation of the amount of the at least one resource to be allocated to the at least one workload; and updating a complexity of the regression model with at least one additional parameter using new data for one or more additional executions of the at least one workload.

10. The computer program product of claim 9, further comprising evaluating a performance of one or more of the plurality of workloads based on a percentage of time within a predefined error range.

11. The computer program product of claim 9, further comprising determining an adjustment to the initial allocation of the at least one resource for the at least one workload based at least in part on one or more of (i) a dynamic system model based on a relation between the amount of the at least one resource for the plurality of workloads and the at least one predefined service metric, (ii) an interference effect of one or more additional workloads of the plurality of workloads on the at least one workload, and (iii) a difference between an instantaneous value of the at least one predefined service metric and a target value for the at least one predefined service metric.

12. The computer program product of claim 9, further comprising replacing the regression model over time with a different model using the new data for the one or more additional executions of the at least one workload.

13. The computer program product of claim 9, further comprising a plurality of the regression models, and wherein an accuracy of each of the plurality of the regression models is evaluated over time to identify a most fitting model.

14. The computer program product of claim 9, further comprising a plurality of the regression models, wherein an accuracy of each of the plurality of the regression models is evaluated over time and wherein at least one of the regression models is retrained when a predefined model degradation standard is violated.

15. An apparatus, comprising:
a memory; and
at least one processing device, coupled to the memory, operative to implement the following steps:
obtaining a dataset comprising data from previous executions of at least one workload of a plurality of workloads, wherein the data comprises a plurality of different resource allocations for the at least one workload and a plurality of different parameterizations of one or more parameters that configure the at least one workload;

determining an initial allocation of an amount of at least one resource to be allocated to the at least one workload by applying, to a regression model characterizing a behavior of the at least one workload, (i) the data comprising at least some of the plurality of different resource allocations for the previous executions of the at least one workload and at least some of the plurality of different parameterizations of one or more parameters that configured the previous executions of the at least one workload, (ii) at least one predefined service metric for the at least one workload and (iii) a characterization of a target infrastructure where the at least one workload will execute;

initiating an application of the determined initial allocation of the amount of the at least one resource to be allocated to the at least one workload; and updating a complexity of the regression model with at least one additional parameter using new data for one or more additional executions of the at least one workload.

16. The apparatus of claim 15, further comprising evaluating a performance of one or more of the plurality of workloads based on a percentage of time within a predefined error range.

17. The apparatus of claim 15, further comprising determining an adjustment to the initial allocation of the at least one resource for the at least one workload based at least in part on one or more of (i) a dynamic system model based on a relation between the amount of the at least one resource for the plurality of workloads and the at least one predefined service metric, (ii) an interference effect of one or more additional workloads of the plurality of workloads on the at least one workload, and (iii) a difference between an instantaneous value of the at least one predefined service metric and a target value for the at least one predefined service metric.

18. The apparatus of claim 15, further comprising replacing the regression model over time with a different model using the new data for the one or more additional executions of the at least one workload.

19. The apparatus of claim 15, further comprising a plurality of the regression models, and wherein an accuracy of each of the plurality of the regression models is evaluated over time to identify a most fitting model.

20. The apparatus of claim 15, further comprising a plurality of the regression models, wherein an accuracy of each of the plurality of the regression models is evaluated over time and wherein at least one of the regression models is retrained when a predefined model degradation standard is violated.

* * * * *